Dec. 24, 1963    A. M. GOLDBERG ETAL    3,115,152
TRANSFUSION EQUIPMENT
Filed Dec. 2, 1960
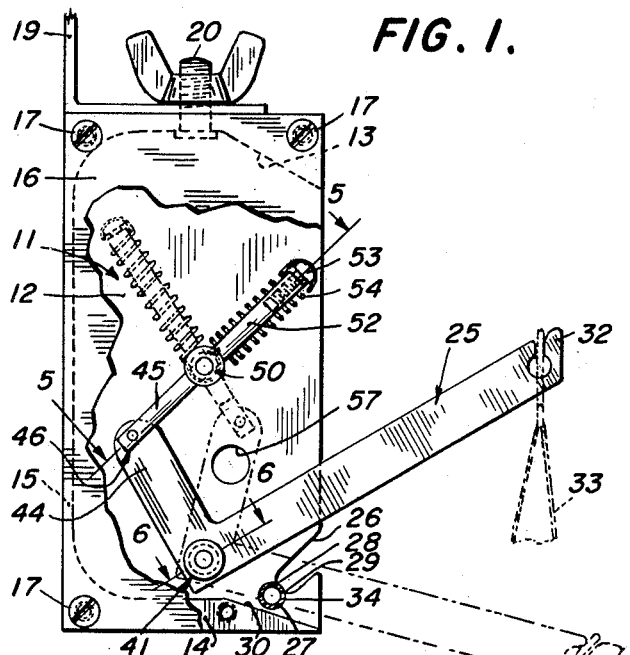
FIG. 1.
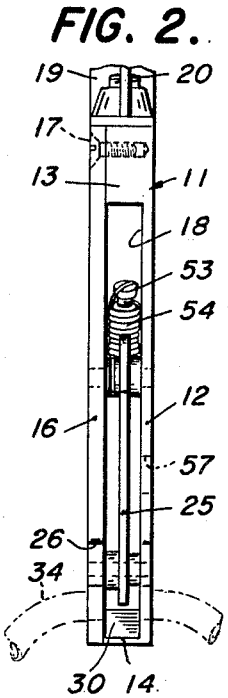
FIG. 2.
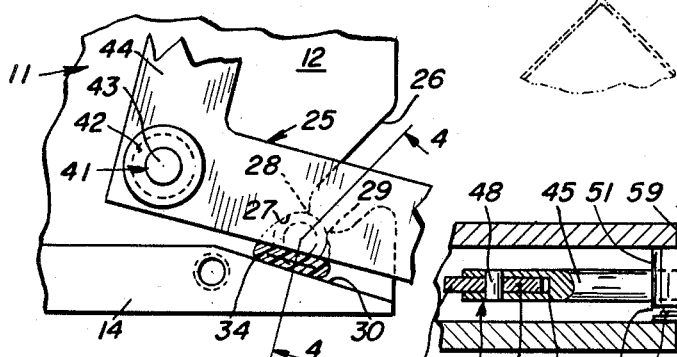
FIG. 3.
FIG. 5.
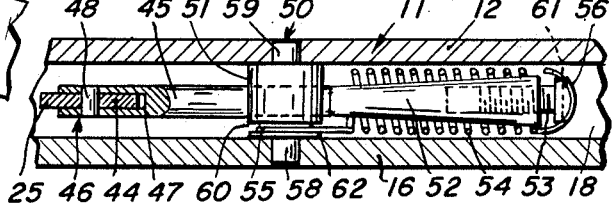
FIG. 4.
FIG. 6.
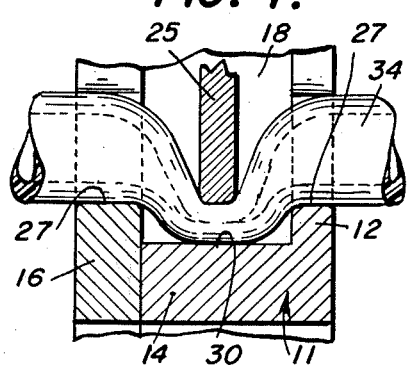
INVENTORS
ALLAN M. GOLDBERG
DONALD A. HAMILTON
STANLEY D. JAMES
BY
Robert T. Merrick

3,115,152
TRANSFUSION EQUIPMENT
Allan M. Goldberg, Arleta, Donald A. Hamilton, Burbank, and Stanley D. James, San Fernando, Calif., assignors to McGaw Laboratories, Inc., Glendale, Calif., a corporation of Delaware
Filed Dec. 2, 1960, Ser. No. 73,447
7 Claims. (Cl. 137—408)

This invention relates to a device for automatically shutting off liquid flow through a collapsible tube after a predetermined quantity of liquid has passed into a container. The device is particularly useful in connection with the drawing of blood into plastic transfusion containers.

It is often desirable to shut off the flow of liquid into a container after an accurately measured, predetermined quantity has entered the container. This is particularly true in the case of plastic blood containers because such containers stretch to sizes considerably larger than their intended volume.

For this reason, an attendant must be present to shut off the flow or an automatic device must me provided to limit the amount of blood drawn. The automatic devices now available are fragile, expensive to make and calibrate, and sometimes fail to completely shut off the flow of liquid.

It is therefor an object of this invention to provide a rugged, but inexpensive, device for automatically shutting off liquid flow, after a predetermined amount of liquid has been drawn.

Another object of the invention is to provide a shutoff device which will consistently and completely shut off liquid flow through a collapsible tube after a desired amount of liquid has passed through the tube.

Another object of the invention is to provide an automatic shutoff device having particular utility in the drawing of blood into flexible plastic containers.

Another object of the invention is to provide a more accurate and dependable transfusion shutoff device.

A further object of the invention is to provide an automatic shutoff device having an easily visible means for indicating that a transfusion container has been filled.

A still further object of the invention is to provide an automatic transfusion shutoff device, the accuracy of which will not be affected by tension on the tube through which blood is being drawn.

Other objects and advantages of my invention will be apparent from the description of the preferred example of the invention and from the accompanying drawings, in which:

FIGURE 1 is an elevational view of the invention, with the cover plate partially cut away;

FIGURE 2 is a right side view of the invention;

FIGURE 3 is an enlarged, fragmentary elevational view, with parts cut away, showing the shutoff device in closed position;

FIGURE 4 is a further enlarged, fragmentary sectional view on the line 4—4 of FIGURE 3;

FIGURE 5 is an enlarged fragmentary, sectional view on the line 5—5 of FIGURE 1; and FIGURE 6 is an enlarged, fragmentary, sectional view on the line 6—6 of FIGURE 1;

As shown in the drawings, the body 11 has a back plate 12, end walls 13 and 14, and a side wall 15. A cover or front plate 16 is fastened to end walls 13, 14 and side wall 15 by bolts 17. At the side of the body opposite side wall 15, cover 16 and back plate 12 define a slot 18, extending from end wall 13 to end wall 14. An upwardly extending bracket or hanger 19 is attached to end wall 13 by a bolt 20 and serves as a means for rigidly attaching body 11 to a bed or standard.

A pivoted support arm 25 extends from body 11 outwardly through slot 18. Below arm 25, back plate 12 and cover plate 16 are cut away to provide access slots 26 leading inwardly and downwardly from the edge of said plates to the tube holders 27. Two detents 28, 29 are provided on opposite sides of slots 26 to prevent a tube 34 from slipping out of tube holders 27. Between the tube holders 27, end wall 14 slants downwardly to provide a tube receiving seat or clamping surface 30 against which arm 25 pinches tube 34 when in the closed position (FIGURE 3). Preferably, clamping surface 30 is located below the wall surfaces forming the bottoms of tube holders 27 so that the portion of tube 34 between the holders 27 is bent downwardly when arm 25 is in the closed position.

Near the outer end of support arm 25, a hook 32 is provided for suspending a container 33 into which fluid is to be drawn. A resilient, collapsible tube 34, preferably made of a suitable plastic, such as extruded polyvinyl chloride, connects with container 33. Tube 34 may be detachably connected to container 33, or permanently sealed thereto.

The end of arm 25 opposite hook 32 is attached to body 11 by a fixed pivot 41. Pivot 41 includes a bearing 42 which is attached to arm 25 and which rotates around pin 43, said pin being held by front and back plates 12 and 16. A link or toggle arm 44 is rigidly attached to arm 25 at pivot 41. A pivoted, sliding rod 45 is joined end-to-end to toggle arm 44 to form a movable joint or knee 46. As shown in FIGURE 5, this is preferably done by cutting away the center of rod 45 to provide a slot 47 in which the end of toggle arm 44 is fastened by pin 48.

Toggle arm 44 may meet arm 25 at an angle of approximately 90° (as shown). Alternatively, toggle arm 44 may be parallel to arm 25 constituting an extension of arm 25 beyond pivot 41. This modification would be more elongated than the illustrated embodiment, since other parts of the device would have to be located in line with toggle arm 44.

Rod 45 extends from movable joint 46 to and beyond a rotating fixed pivot 50. Pivot 50 has two cylindrical end sections 58, 59 rotatably mounted in plates 12 and 16, and an enlarged diameter, cylindrical section 51. Section 51 has a transverse passage in which rod 45 is slideably received. Pivot 50 is preferably made of a polyacetal, such as Delrin, or other plastic material having a low coefficient of friction. An extension 52 of rod 45 projects beyond pin 51. A bolt 53 threads axially into the end of extension 52, thereby providing a means for adjusting the effective length of rod 45. A tension spring 54 is anchored at one end by a hook 55 which fits into a groove 60 in the enlarged section 51 of pivot 50. A hook 56 at the other end of spring 54 fits into a slot 61 in bolt 53 causing the spring to exert an endwise force urging rod 45 toward knee 46. An annular flange 62 is located between groove 60 and the inner surface of the front plate 16, and holds spring 54 away from said surface.

Alternatively, tension spring 54 may be replaced by a compression spring, one end of which is connected to toggle arm 44 and the other end of which is connected to pivot 50. Such an embodiment would probably be more difficult to calibrate and to assure alignment of the spring than the preferred embodiment described above, but would function adequately for at least some uses.

In use, the operator places arm 25 in its uppermost or open position (FIGURE 1), suspends a flexible plastic container 33 from hook 32, passes a section of a collapsible tube 34 connected to container 33 down the slots 26 into tube holder 27 and snaps arm 25 down to clamp off tube 34 (FIGURE 3). A needle (not shown) attached to the end of tube 34 opposite container 33 is then carefully placed in the vein of a blood donor. The shutoff device is then cocked by raising arm 5 to its open position, unclamping tube 34 so that blood can flow through it into container 33.

As blood enters container 33, arm 25 moves slowly downward against the force of tension spring 54, turning pivot 41 in a clockwise direction. As the weight of container 33 increases, rod 45 slides through pivot 50 lengthening the rod portion 52 above pivot 50 and stretching spring 54. As the weight of container 33 further increases, pivot 50 turns slowly and steadily, changing the angle at which the endwise force of rod 54 is applied to toggle arm 44. Eventually, the total moment resisting clockwise rotation of pivot 41 reaches a maximum. This preferably occurs just before the lower surface of arm 25 first contacts the upper surface of uncollapsed tube 34. Additional rotation of pivot 50 decreases the total moment resisting clockwise rotation of pivot 41 and this moment is exceeded by the clockwise moment. This trips the shutoff device and arm 25 drops suddenly to a closed position. In moving to the closed position, arm 44 and rod 45 pass through a position of mechanical toggle; that is, a position in which pivots 41 and 50 and joint 46 all lie in a straight line. An audible "snap" indicates the clamp is closed.

In the closed position, tension spring 54 is still extended, the endwise force of rod 45 urging toggle arm 44 in a clockwise direction around pivot 41. Thus, in the closed position, the force of tension spring 54 as well as the full weight of the filled container 33 urges arm 25 down against tube 34. By this combination of co-operating forces, the flow can be completely and consistently shut off even through a relatively stiff plastic tube. Moreover, arm 25 does not collapse tube 34 until after the shutoff device is tripped. For this reason, flow through tube 34 is not restricted near the end of the drawing process, but continues at maximum rate until the shutoff device is tripped.

If desired, an indicator opening 57 may be provided in back plate 12, or in cover 16 at a location adjacent toggle arm 44 when the shutoff device is in closed position. Arm 44 can then be identified by a color which contrasts with the color of plate 12 or 16, so that a quick glance is sufficient to tell the operator when the device is in closed position.

In the foregoing description, we have described a preferred embodiment of the invention in considerable detail for the purpose of illustration. However, it is understood that structural details of the invention may be varied by those skilled in the art, without departing from the spirit of our invention.

We claim:

1. An automatic shut-off device for use with a transfusion container comprising: a body having a slot-like opening; a pivot rotatably mounted in said body; a support arm attached to said pivot, extending outwardly through said slot-like opening and being movable in said slot-like opening by rotation around said pivot; means on said support arm outwardly of said body for attaching a transfusion container thereon; a first toggle arm rigidly attached to the support arm at said pivot and extending laterally from said support arm; a second pivot in said body; a second toggle arm attached to said first toggle arm by a movable joint, said second toggle arm slidably engaging the second pivot; a portion of said second toggle arm extending beyond said second pivot; and spring means mounted on said second toggle arm portion, one end of said spring means engaging said second pivot and the other end being substantially fixed at the terminal end of said second toggle arm portion, said body including a tube-receiving seat disposed in intersecting relation to the pivotal path of said support arm; whereby in the "open" condition of the shut-off device, the spring means acting on the said toggle arms provides a moment urging the support arm to pivot around said first pivot in one direction, while the weight of both the transfusion container and its contents acting on said support arm provides a moment urging said support arm to pivot in the reverse direction, and in the "closed" condition of said shut-off device, the weight of both the transfusion container and its contents, and the spring means acting on said toggle arms provide moments urging said support arm to pivot around said first pivot in a reverse direction.

2. The structure of claim 1 in which said second toggle arm portion includes adjustment means in engagement with said spring means for adjusting the force imposed thereby, said adjustment means being accessible at said slot-like opening to permit manual adjustment thereof.

3. The structure of claim 2 in which said adjustment means comprises a screw engaged by the other end of said spring means and adjustable to change the effective length of said second toggle arm.

4. The structure of claim 1 wherein said tube-receiving seat opens laterally of said body and is disposed adjacent the lower portion of said slot-like opening.

5. The structure of claim 1 in which said second pivot includes a transverse passage therethrough; said second toggle arm extending through said transverse passage.

6. The structure of claim 1 in which said spring means comprises a tension spring circumposed about said second toggle arm and attached to said second pivot.

7. An automatic shutoff device as set forth in claim 1 wherein the first toggle arm is obscured by an opaque body wall portion, said first toggle arm is provided with a color contrasting to the color of the body wall portions, and an opening is provided in the body wall portion immediately adjacent said toggle arm when the shutoff device is in the closed position, whereby the contrasting color of the toggle arm shows through the opening to indicate that the shutoff device is in the closed position.

References Cited in the file of this patent

UNITED STATES PATENTS

| | | |
|---|---|---|
| 195,274 | Hayes | Sept. 18, 1877 |
| 1,493,640 | Nachbaur | May 13, 1924 |
| 2,236,559 | Andersson | Apr. 1, 1941 |
| 2,814,310 | Lower | Nov. 26, 1957 |
| 2,941,778 | Bujan | June 21, 1960 |
| 3,016,915 | Moeller | Jan. 16, 1962 |

FOREIGN PATENTS

| | | |
|---|---|---|
| 579,997 | France | Aug. 19, 1924 |